US010621612B2

(12) United States Patent
Fisher

(10) Patent No.: US 10,621,612 B2
(45) Date of Patent: *Apr. 14, 2020

(54) DISPLAYING AN ADVERTISEMENT IN RESPONSE TO USER INPUT USING A NON-BROWSER BASED APPLICATION

(71) Applicant: Michelle Fisher, Berkeley, CA (US)

(72) Inventor: Michelle Fisher, Berkeley, CA (US)

(73) Assignee: Michelle Fisher, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,874

(22) Filed: Jun. 28, 2019

(65) Prior Publication Data

US 2019/0392476 A1 Dec. 26, 2019

Related U.S. Application Data

(63) Continuation of application No. 15/980,735, filed on May 15, 2018, now Pat. No. 10,339,556, which is a
(Continued)

(51) Int. Cl.
*H04M 3/00* (2006.01)
*G06Q 30/02* (2012.01)
(Continued)

(52) U.S. Cl.
CPC ....... *G06Q 30/0239* (2013.01); *G06F 3/0484* (2013.01); *G06Q 20/322* (2013.01); *G06Q 30/0267* (2013.01); *G06Q 30/0277* (2013.01); *G06Q 40/02* (2013.01); *H04L 63/0428* (2013.01); *H04L 67/34* (2013.01); *H04W 4/02* (2013.01); *H04W 4/024* (2018.02); *H04W 4/60* (2018.02); *H04W 4/80* (2018.02); *H04L 67/306* (2013.01); *H04M 1/72525* (2013.01); *H04M 1/72544* (2013.01); *H04W 8/18* (2013.01)

(58) Field of Classification Search
CPC .......... G06Q 30/0239; G06Q 30/0277; G06Q 30/0267; G06Q 20/322; G06Q 40/02; G06F 3/0484; H04L 63/0428; H04L 67/34; H04L 67/306; H04W 4/02; H04W 4/008; H04W 4/003; H04W 8/18; H04M 1/72544; H04M 1/72525
USPC ................... 455/456.1–456.3, 418; 370/338
See application file for complete search history.

(56) References Cited

U.S. PATENT DOCUMENTS 6,038,367 A 3/2000 Abecassis
6,101,483 A 8/2000 Petrovich
(Continued)

OTHER PUBLICATIONS

U.S. Appl. No. 11/933,337, Office Action dated May 27, 2010, 9 p.
(Continued)

*Primary Examiner* — Marcos Batista

(57) ABSTRACT

A method and system for customizing a mobile application running on a mobile communication device of a user. In one implementation, the method includes providing the mobile application to the mobile communication device of the user, the mobile application having a generic platform; determining a special interest group (SIG) that is affiliated with the user; and customizing the generic platform of the mobile application based on information specific to the special interest group (SIG) that is affiliated with the user.

38 Claims, 8 Drawing Sheets

Related U.S. Application Data continuation of application No. 15/134,101, filed on Apr. 20, 2016, now Pat. No. 9,996,849, which is a continuation of application No. 14/180,562, filed on Feb. 14, 2014, now abandoned, which is a continuation of application No. 11/956,261, filed on Dec. 13, 2007, now Pat. No. 8,693,995.

(51) Int. Cl.

| | | |
|---|---|---|
| H04W 4/80 | (2018.01) | |
| H04W 4/024 | (2018.01) | |
| G06Q 40/02 | (2012.01) | |
| H04L 29/08 | (2006.01) | |
| G06F 3/0484 | (2013.01) | |
| G06Q 20/32 | (2012.01) | |
| H04L 29/06 | (2006.01) | |
| H04W 4/02 | (2018.01) | |
| H04W 4/60 | (2018.01) | |
| H04M 1/725 | (2006.01) | |
| H04W 8/18 | (2009.01) | |

(56) References Cited

U.S. PATENT DOCUMENTS

| | | | |
|---|---|---|---|
| 6,115,601 A | 9/2000 | Ferreira | |
| 6,123,259 A | 9/2000 | Ogasawara | |
| 6,128,655 A | 10/2000 | Fields | |
| 6,141,666 A | 10/2000 | Tobin | |
| 6,199,082 B1 | 3/2001 | Ferrel | |
| 6,250,557 B1 | 6/2001 | Forslund | |
| 6,415,156 B1 | 7/2002 | Stadelmann | |
| 6,450,407 B1 | 9/2002 | Freeman | |
| 6,477,373 B1* | 11/2002 | Rappaport | H04W 36/0079 455/436 |
| 6,587,835 B1 | 7/2003 | Treyz | |
| 6,605,120 B1 | 8/2003 | Fields | |
| 6,771,981 B1 | 8/2004 | Zalewski | |
| 6,772,396 B1 | 8/2004 | Cronin | |
| 6,886,017 B1 | 4/2005 | Jackson | |
| 6,950,939 B2 | 9/2005 | Tobin | |
| 7,031,945 B1 | 4/2006 | Donner | |
| 7,069,248 B2 | 6/2006 | Huber | |
| 7,096,003 B2 | 8/2006 | Joao | |
| 7,110,744 B2 | 9/2006 | Freeny | |
| 7,110,792 B2 | 9/2006 | Rosenberg | |
| 7,127,236 B2 | 10/2006 | Khan | |
| 7,200,578 B2 | 4/2007 | Paltenghe | |
| 7,289,810 B2 | 10/2007 | Jagadeesan | |
| 7,308,254 B1 | 12/2007 | Rissanen | |
| 7,357,312 B2 | 4/2008 | Gangi | |
| 7,379,920 B2 | 5/2008 | Leung | |
| 7,472,829 B2 | 1/2009 | Brown | |
| 7,482,925 B2 | 1/2009 | Hammad | |
| 7,512,567 B2 | 3/2009 | Bemmel | |
| 7,522,905 B2 | 4/2009 | Hammad | |
| 7,784,684 B2 | 8/2010 | Labrou | |
| 7,870,077 B2 | 1/2011 | Woo | |
| 7,979,519 B2 | 7/2011 | Shigeta | |
| 8,005,426 B2 | 8/2011 | Huomo | |
| 8,019,362 B2 | 9/2011 | Sweatman | |
| 8,073,424 B2 | 12/2011 | Sun | |
| 8,086,534 B2 | 12/2011 | Powell | |
| 8,109,444 B2 | 2/2012 | Jain | |
| 8,121,945 B2 | 2/2012 | Rackley | |
| 8,127,984 B2 | 3/2012 | Zatloukal | |
| 8,423,408 B1 | 4/2013 | Barnes | |
| 2001/0011250 A1 | 8/2001 | Paltenghe | |
| 2001/0044751 A1 | 11/2001 | Pugliese | |
| 2002/0056091 A1 | 5/2002 | Bala | |
| 2002/0059100 A1 | 5/2002 | Shore | |
| 2002/0063895 A1 | 5/2002 | Agata | |
| 2002/0065774 A1 | 5/2002 | Young | |
| 2002/0077084 A1* | 6/2002 | Zellner | G06Q 30/0207 455/414.2 |
| 2002/0077918 A1 | 6/2002 | Lerner | |
| 2002/0082879 A1 | 6/2002 | Miller | |
| 2002/0107756 A1 | 8/2002 | Hammons | |
| 2002/0160761 A1 | 10/2002 | Wolfe | |
| 2002/0169984 A1 | 11/2002 | Kumar | |
| 2002/0184096 A1* | 12/2002 | Kawahara | G06Q 30/02 705/14.64 |
| 2003/0061113 A1 | 3/2003 | Petrovich | |
| 2003/0065805 A1 | 4/2003 | Barnes | |
| 2003/0074259 A1 | 4/2003 | Slyman | |
| 2003/0085286 A1 | 5/2003 | Kelley | |
| 2003/0087601 A1 | 5/2003 | Agam | |
| 2003/0093695 A1 | 5/2003 | Dutta | |
| 2003/0105641 A1 | 6/2003 | Lewis | |
| 2003/0132298 A1 | 7/2003 | Swartz | |
| 2003/0140004 A1 | 7/2003 | O'Leary | |
| 2003/0163359 A1 | 8/2003 | Kanesaka | |
| 2003/0172028 A1 | 9/2003 | Abell | |
| 2004/0006497 A1 | 1/2004 | Nestor | |
| 2004/0030601 A1 | 2/2004 | Pond | |
| 2004/0030658 A1 | 2/2004 | Cruz | |
| 2004/0034544 A1 | 2/2004 | Fields | |
| 2004/0064408 A1 | 4/2004 | Kight | |
| 2004/0073497 A1 | 4/2004 | Hayes | |
| 2004/0078266 A1 | 4/2004 | Kim | |
| 2004/0127256 A1 | 7/2004 | Goldthwaite | |
| 2004/0235450 A1 | 11/2004 | Rosenberg | |
| 2004/0243519 A1 | 12/2004 | Perttila | |
| 2004/0254836 A1 | 12/2004 | Emoke Barabas | |
| 2004/0267618 A1 | 12/2004 | Judicibus | |
| 2004/0267665 A1 | 12/2004 | Nam | |
| 2005/0003810 A1 | 1/2005 | Chu | |
| 2005/0040230 A1 | 2/2005 | Swartz | |
| 2005/0076210 A1 | 4/2005 | Thomas | |
| 2005/0165646 A1 | 7/2005 | Tedesco | |
| 2005/0187873 A1 | 8/2005 | Labrou | |
| 2005/0215231 A1 | 9/2005 | Bauchot | |
| 2006/0031752 A1 | 2/2006 | Surloff | |
| 2006/0089874 A1 | 4/2006 | Newman | |
| 2006/0091200 A1 | 5/2006 | Lai | |
| 2006/0114987 A1* | 6/2006 | Roman | H04N 7/142 375/240.01 |
| 2006/0143091 A1 | 6/2006 | Yuan | |
| 2006/0149630 A1* | 7/2006 | Elliott | G06Q 30/02 705/14.64 |
| 2006/0178130 A1 | 8/2006 | Makrygiannis | |
| 2006/0191995 A1 | 8/2006 | Stewart | |
| 2006/0206709 A1 | 9/2006 | Labrou | |
| 2006/0219780 A1 | 10/2006 | Swartz | |
| 2007/0004391 A1 | 1/2007 | Maffeis | |
| 2007/0011099 A1 | 1/2007 | Sheehan | |
| 2007/0022058 A1 | 1/2007 | Labrou | |
| 2007/0067329 A1 | 3/2007 | Kamvar | |
| 2007/0095892 A1 | 5/2007 | Lyons | |
| 2007/0125838 A1 | 6/2007 | Law | |
| 2007/0125840 A1 | 6/2007 | Law | |
| 2007/0138299 A1 | 6/2007 | Mitra | |
| 2007/0131759 A1 | 7/2007 | Cox | |
| 2007/0156436 A1 | 7/2007 | Fisher | |
| 2007/0204004 A1 | 8/2007 | Coyer | |
| 2007/0210155 A1 | 9/2007 | Swartz | |
| 2007/0235519 A1 | 10/2007 | Jang | |
| 2007/0255662 A1 | 11/2007 | Tumminaro | |
| 2007/0270166 A1 | 11/2007 | Hampel | |
| 2007/0293155 A1 | 12/2007 | Liao | |
| 2008/0010190 A1 | 1/2008 | Rackley | |
| 2008/0010196 A1 | 1/2008 | Rackley | |
| 2008/0017704 A1 | 1/2008 | Vandeburg | |
| 2008/0294556 A1 | 1/2008 | Anderson | |
| 2008/0045172 A1 | 2/2008 | Narayanaswami | |
| 2008/0046366 A1 | 2/2008 | Bemmel | |
| 2008/0048022 A1 | 2/2008 | Vawter | |
| 2008/0051059 A1 | 2/2008 | Fisher | |
| 2008/0051142 A1 | 2/2008 | Calvet | |
| 2008/0052192 A1 | 2/2008 | Fisher | |
| 2008/0052233 A1 | 2/2008 | Fisher | |
| 2008/0139155 A1 | 6/2008 | Boireau | |
| 2008/0167988 A1 | 7/2008 | Sun | |
| 2008/0177668 A1 | 7/2008 | Delean | |

(56) References Cited

U.S. PATENT DOCUMENTS

| | | | |
|---|---|---|---|
| 2008/0208681 A1 | 8/2008 | Hammad | |
| 2008/0208743 A1 | 8/2008 | Arthur | |
| 2008/0208744 A1 | 8/2008 | Arthur | |
| 2008/0208762 A1 | 8/2008 | Arthur | |
| 2008/0221997 A1 | 9/2008 | Wolfe | |
| 2008/0255947 A1 | 10/2008 | Friedman | |
| 2008/0275779 A1 | 11/2008 | Lakshminarayanan | |
| 2008/0281694 A1 | 11/2008 | Kretz | |
| 2008/0305774 A1 | 12/2008 | Ramakrishna | |
| 2009/0063312 A1 | 3/2009 | Hurst | |
| 2009/0076906 A1 | 3/2009 | Kansai | |
| 2009/0098825 A1 | 4/2009 | Huomo | |
| 2009/0106112 A1 | 4/2009 | Dalmia | |
| 2009/0124234 A1 | 5/2009 | Fisher | |
| 2009/0132362 A1 | 5/2009 | Fisher | |
| 2009/0144161 A1 | 6/2009 | Fisher | |
| 2009/0227281 A1 | 9/2009 | Hammad | |
| 2010/0057619 A1 | 3/2010 | Weller | |
| 2010/0063895 A1 | 3/2010 | Dominguez | |
| 2010/0105375 A1* | 4/2010 | Schroter | H04L 63/0853 455/419 |
| 2011/0320316 A1 | 12/2011 | Randazza | |

OTHER PUBLICATIONS

U.S. Appl. No. 11/933,351, Office Action dated Oct. 3, 2008, 5 p.
U.S. Appl. No. 11/933,367, Office Action dated May 27, 2010, 8 p.
U.S. Appl. No. 11/467,441, Office Action dated May 27, 2009, 17 p.
U.S. Appl. No. 12/592,581, Office Action dated Jun. 4, 2010, 20 p.
U.S. Appl. No. 11/933,351, Office Action dated Jul. 8, 2009, 7 p.
U.S. Appl. No. 11/939,821, Office Action dated Aug. 17, 2010, 11 p.
U.S. Appl. No. 11/933,351, Office Action dated Aug. 18, 2010, 16 p.
U.S. Appl. No. 11/933,321, Office Action dated May 27, 2010, 11 p.
U.S. Appl. No. 15/134,101, Office Action dated, Nov. 2, 2017.
Deena, M. Amato, "Mobile Rewards." Chain Store Age 82.5 (2006): 160, 161, 163. Hoover's Company Profiles; ProQuest Central. Web. Oct. 5, 2012.
"ViVOtech to DemonstrateIndustry's First End-to-End Near Field Communication (NFC) Solution at the NRF Show." Business Wire: 1 Jan. 16, 2006. Business Dateline; Hoover's Company Profiles; ProQuest Central. Web. Oct. 5, 2012.
"Text Messaging" https://en.m.wikipedia.org/wiki/Text_messaging.
"Text Based User Interface" https://en.wikipedia.org/wiki/User_interface.
"WAP" https://en.wikipeda.org/wiki/Wireless_Application_Protocol.
"Multimedia messaging" https://en.wikipedia.org/wiki/Multimedia_Messaging_Service#Technical_description.
Web based user interface https://en.wikipedia.org/wiki/User_interface.
Ajax https://techterms.com/definition/ajax.
Java script https://techterms.com/definition/javascript.
"Browser games" www.60freegames.com/Free-to-Play/Browser-Games.
"Online shopping "https://en.wikipedia.org/wiki/Online_shopping.
"Social networking services" https://en.wikipedia.org/wiki/Social_networking_service.
"Web mapping" https://en.wikipedia.org/wiki/Web_mapping.
"Mobile browser" https://en.wikipedia.org/wiki/Mobile_browser.
"Voice browser" https://en.wikipedia.org/wiki/Voice_browser.
"Email" https://techterms.com/definition/email.
"Web mail" https://en.wikipedia.org/wiki/Webmail ).
"WAP Browser" https://en.m.wikipedia.org/wiki/Wireless_Application_Protocol.
"Binary application" https://en.m.wikipedia.org/wiki/Application_binary_interface.

* cited by examiner

DISPLAYING AN ADVERTISEMENT IN RESPONSE TO USER INPUT USING A NON-BROWSER BASED APPLICATION

CROSS-REFERENCE TO RELATED APPLICATIONS

This application is a is a continuation and claims priority to U.S. patent application Ser. No. 15/980,735 filed May 15, 2018 titled, "SELECTING AND TRANSMITTING AN ADVERTISEMENT FROM A REMOTE MANAGEMENT SERVER" which is a continuation and claims priority to U.S. patent application Ser. No. 15/134,101 filed Apr. 20, 2016, titled REMOTE DELIVERY OF ADVERTISEMENTS now U.S. Pat. No. 9,996,849 which is a continuation and claims priority to U.S. patent application Ser. No. 14/180,562, filed Feb. 14, 2014, titled "CUSTOMIZED INFORMATION WITHOUT AUTHENTICATION" which is a continuation and claims priority to U.S. patent application Ser. No. 11/956,261, filed Dec. 13, 2007, titled "METHOD AND SYSTEM FOR DELIVERING CUSTOMIZED INFORMATION TO A MOBILE COMMUNICATION DEVICE BASED ON USER AFFILIATIONS" now U.S. Pat. No. 8,693,995, which is incorporated by reference herein in its entirety.

FIELD OF INVENTION

The present invention relates to data communications and wireless devices.

BACKGROUND OF THE INVENTION

Mobile communication devices—e.g., cellular phones, personal digital assistants, and the like—are increasingly being used to conduct payment transactions (e.g., through mobile wallet applications) as described in U.S. patent application Ser. No. 11/933,351, entitled "Method and System For Scheduling A Banking Transaction Through A Mobile Communication Device", and U.S. patent application Ser. No. 11/467,441, entitled "Method and Apparatus For Completing A Transaction Using A Wireless Mobile Communication Channel and Another Communication Channel, both of which are incorporated herein by reference. Such payment transactions can include, for example, purchasing goods and/or services, bill payments, and transferring funds between bank accounts.

In the mobile communication device space, delivering separate, customized mobile applications to mobile communications devices can be quite expensive in terms of cost and memory. For example, in the United States, AT&T recently announced that their mobile communication device platform will only support up to two mobile wallet applications. Such constraints, as well as limited device memory, limit the number of customized applications that an end user can run on a mobile communication device.

BRIEF SUMMARY OF THE INVENTION

In general, in one aspect, this specification describes a method for customizing a mobile application running on a mobile communication device of a user. The method includes providing the mobile application to the mobile communication device of the user, the mobile application having a generic platform; determining a special interest group (SIG) that is affiliated with the user; and customizing the generic platform of the mobile application based on information specific to the special interest group (SIG) that is affiliated with the user.

Particular implementations can include one or more of the following features. Customizing the generic platform of the mobile application can comprise displaying one or more of a logo, advertisement, coupon, alert, notification, or map that is associated with the special interest group (SIG) through the mobile application running on the mobile communication device. The special interest group (SIG) can be one of a university, corporation, military, government, sports team, or alumni association. The generic platform of the mobile application can be customizable by a plurality of different special interest groups (SIGs). The generic platform of the mobile application can comprise a generic user interface having default screens, controls, or logos that are changeable based on an affiliation of the user to the plurality of different special interest groups (SIGs). Customizing the generic platform of the mobile application can comprise updating only content that is being displayed through the mobile application. Customizing the generic platform of the mobile application can comprise customizing a number of modules that are presented to users through the mobile application. The modules can comprise one or more of a money management module that permits a user to access account information from a financial institution, a what's nearby module that permits a user to find points of interest (POI) and directions, a rewards module that permits a user to keep track of reward or loyalty cards, a ticket module that permits a user to purchase a ticket for an event, and an options module that permits a user to change the look-and-feel of the mobile application. The mobile communication device can be one of a cellular phone or a wireless personal digital assistant (PDA).

In general, in another aspect, this specification describes a system including a management server to provide a mobile application to a mobile communication device of a user, in which the mobile application has a generic platform. The management server further determines a special interest group (SIG) that is affiliated with the user, and customizes the generic platform of the mobile application based on information specific to the special interest group (SIG) that is affiliated with the user.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

Figure 1:
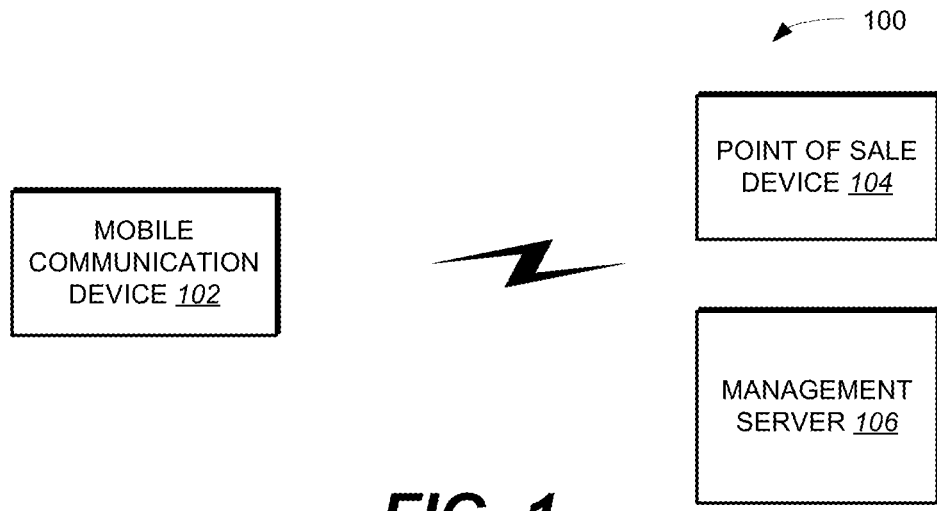
FIG. 1 illustrates a block diagram of a communication system including a mobile communication device and a management server in accordance with one implementation.

FIG. 1 illustrates one implementation of a communication system 100. The communication system 100 includes a hand-held, wireless mobile communication device 102 a point-of-sale device 104 and a management server 106. In one implementation, the mobile communication device 102 includes a mobile application (discussed in greater detail below) that permits a user of the mobile communication device 102 to conduct payment transactions. Payment transactions can include, for example, using contactless payment technology at a retail merchant point of sale (e.g., through point of sale device 104), using mobile/internet commerce (e.g., purchase tickets and products, etc.), storage of payment information and other digital artifacts (e.g., receipts, tickets, coupons, etc.), storage of banking information (payment account numbers, security codes, PIN's, etc.), and accessing banking service (account balance, payment history, bill pay, fund transfer, etc.), and so on. The mobile communication device 102 can be a cellular phone, a wireless personal digital assistant (PDA), or other wireless communication device.

Figure 2:
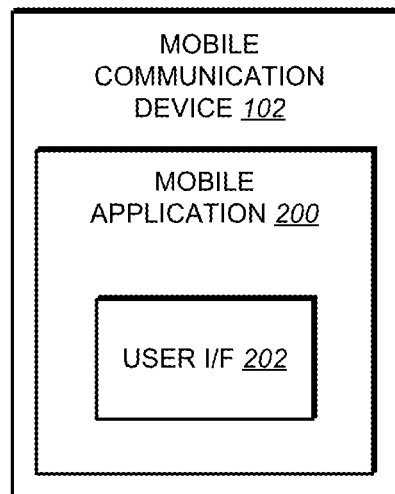
FIG. 2 illustrates one implementation of the mobile communication device of FIG. 1.

FIG. 2 illustrates one implementation of the mobile communication device 102. The mobile communication device 102 includes a mobile application 200 that (in one implementation) is provided to the mobile communication device 102 through a remote server (e.g., management server 106). In one implementation, the mobile application is a mobile wallet application (e.g., the Blaze Mobile Wallet application) available from Mobile Candy Dish, Inc., of Alameda, Calif. In one implementation, the mobile application is a hosted service, as described in U.S. patent application Ser. No. 11/939,821, entitled "Method and System For Securing Transactions Made Through a Mobile Communication Device", which is incorporated herein by reference. In one implementation, the mobile application 200 is configured to send requests to the management server for artifacts based on user input, e.g., received though a keypad (not shown) of the mobile communication device 102. Requests to the management server 106 can also be automated, via proximity-based services, e.g., consumer tapping (or in close proximity) an LBS/contactless/RFID enabled phone against a smart poster (RFID/Bluetooth/LBS enabled, etc.), kiosk, or other device.

As shown in FIG. 2, the mobile application 200 includes a user interface 202 that is displayable on a display of the mobile communication device 102. In one implementation, the user interface 202 is a generic user interface (or platform) that can be customized based on one or more special interest groups (SIG) that are affiliated with a user of the mobile communication device 102. In general, the user interface 202 can be customized to display, e.g., screens, logos, messages, maps, coupons, advertisements, and other information, as discussed in greater detail below. In one implementation, a special interest group (SIG) is an organization. For example, a special interest group can be a university, corporation, military, government, sports team, alumni association, and the like. These (and other SIGs) generally have a need to brand and customize mobile applications they either sponsor or associate their name to. This is mandated because SIGs tend to heavily invest in promoting their name and brand recognition. Co-branding the mobile application with well-known third party brands will facilitate community exposure, help drive consumer acceptance and adoption through viral marketing (inherent to the community) as well as marketing programs by the SIG.

Usually, the format used by the mobile application 200 remains reasonably constant over time in contrast to content, which typically changes on a regular basis based on time and the SIG. In one implementation, as content changes on a regular basis, a SIG uploads only the new content to the management server (e.g., management server 106). Accordingly, when the mobile application 200 next accesses the content of the management server 106, the management server 106 uploads the new (customized SIG) content (and format if applicable) to the mobile application 200. Subsequent uploads to the mobile application 200 can include only content since the format, in one implementation, is cached on the mobile communication device 102 after the first download. If the SIG desires to change the format at a subsequent time, the next upload to the mobile application 200 can include both the new layout format and any new content.

In one implementation, the mobile application 200 comprises a plurality of different modules, in which each module provides a specific function for a user. For, example, the Blaze Mobile Wallet application provides the following example modules:

Money Management—A user can access account information (e.g., balance, transaction history, and so on) from banks and credit card financial institutions. A user can also pay bills, transfer funds (e.g., person-to-person, me-to-me same bank, and me-to-me different bank). A user can also have their paychecks directly deposited into in their mobile wallet, withdraw cash from ATM machines, or pick up cash at a redemption location. A user can also use a contactless debit card associated with their mobile wallet to buy products at participating contactless merchants and receive their transaction history in their mobile wallet in real-time.

What's Nearby—A user can find points of interest (POI), directions, and access maps using this module. For example, a user can find points of interest from over a dozen categories such as restaurants, shopping malls, golf courses, gas stations, regular merchants, theaters, ATM locations, and so on. With respect to directions and maps, a user can get turn-by-turn directions and a viewable map with zooming capability.

Rewards/Loyalty/Coupons—A user can keep track of reward/loyalty cards—e.g., frequently flyer account number, rental car reward membership, hotel reward membership, and the like—through the rewards module. In one implementation, a user can view, in real-time, a summary of all rewards (e.g., points accumulated) directly on a cellular phone. A user can also search for and store coupons on their mobile communication device for use during, e.g., a contactless purchase.

Tickets—This module permits a user to purchase tickets for e.g., movies, sport events, and other entertainment events, through their mobile communication device. A user can also view movie trailers and read reviews through their mobile communication device.

Options—Through this module a user can customize the look and feel of the mobile application, including setting the colors, graphics, logos, and so on. A user can also set a default payment method, send feedback, tell-a-friend, earn reward points, and the like.

The modules above are example modules. The mobile application can provide other modules to perform additional functions for a user over a mobile communication device—e.g., an additional module can include an Internet Purchase module that permits users to use their mobile communication device to purchase items over the Internet. In one implementation, a special interest group (SIG) can modify the number of modules that are available to a user (or users). For example, a particular special interest group (SIG) may only want to provide a rewards program to users, and therefore, the special interest group (SIG) can modify the mobile application 200 to present only a rewards module as described above. In general, a special interest group (SIG) can modify the mobile application 200 to provide any number and combination of modules to users.

Figure 3:
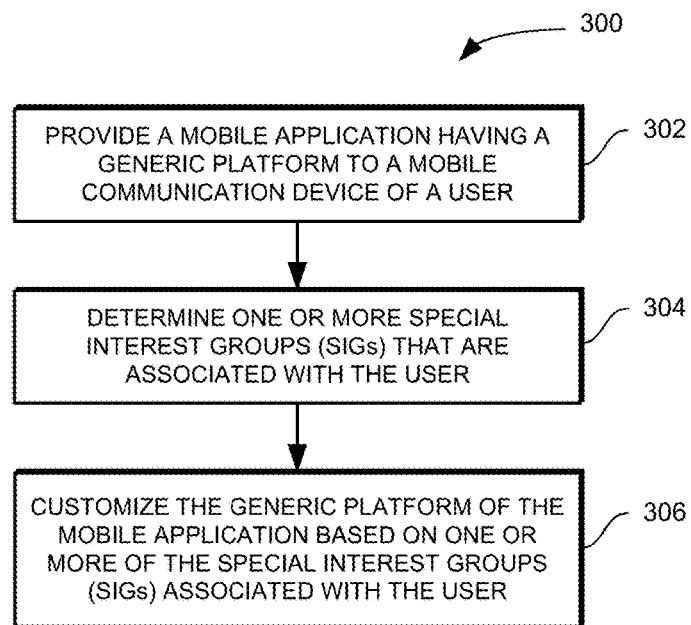
FIG. 3 illustrates one implementation of a method for customizing a mobile application running on a mobile communication device.

FIG. 3 illustrates a method 300 for customizing a mobile application (e.g., mobile application 200) running on a mobile communication device. (e.g., mobile communication device 102). A mobile application having a generic platform is provided to a mobile communication device of a user (step 302). In one implementation, the mobile application is provided to the mobile communication device through a network—e.g., a public network (e.g., the Internet), a private network, or a voice communications network. The generic platform can comprise a generic user interface having default screens, controls, and/or logos. A determination is made (e.g., by management server 106) of one or more special interest groups (SIGs) that are associated with the user (step 304). In one implementation, the management server 306 queries a database (e.g., an affiliate content database) to determine which special interest groups (SIGs) that a given user is associated with. The generic platform of the mobile application is customized based on one or more of the special interest groups (SIGs) that are associated with the user (step 306).

In one implementation, association between a SIG and an end user is validated via an out-of-band process—e.g., a banking customer may have to specify their SIG and provide their SIG credentials (e.g., online banking userID/password) that are unique to the SIG. The management server validates the credentials with the SIG. Once the end user has been authenticated by the SIG, it will be possible to deliver the SIG's branding and messaging specifically to the end user. Such a technique minimizes the number of applications that need to be executed by a mobile communication device. For example, a single mobile application can be customized by a large number of different special interest groups (SIGs). In one implementation, the mobile application can be customized to display different screens, user interfaces and/or controls. Less memory is, therefore, required by a mobile communication device in order to support applications required by multiple special interest groups (SIGs).

Figure 4:
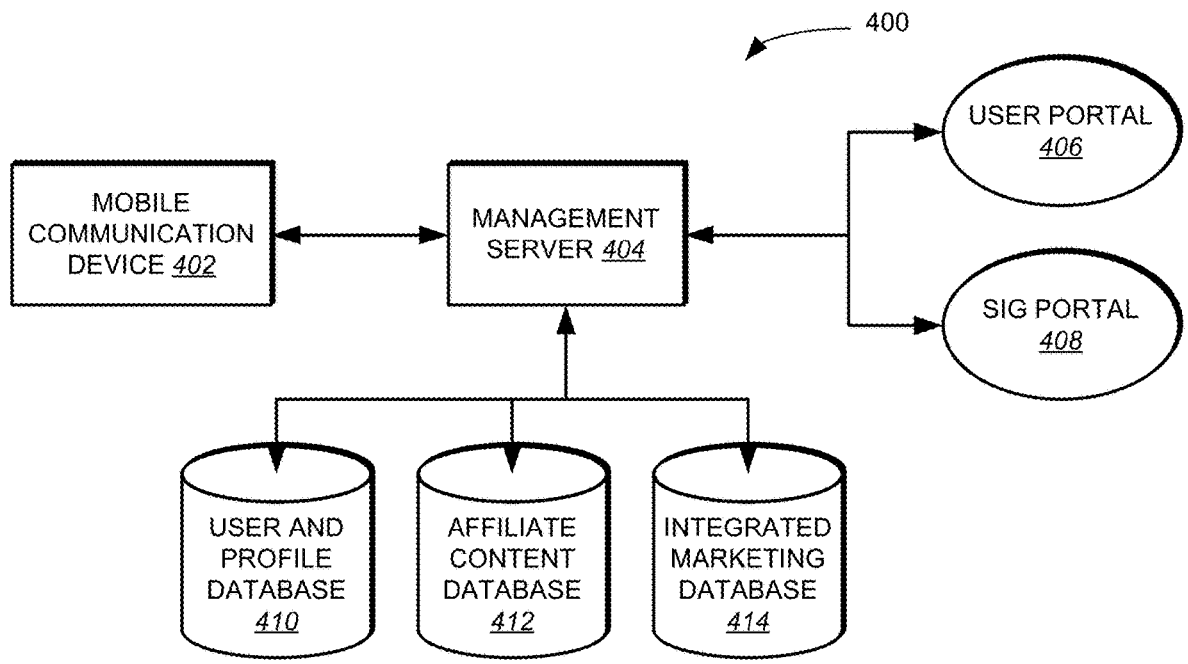
FIG. 4 illustrates a block diagram of a communication system including a mobile communication device and a management server in accordance with one implementation.

FIG. 4 illustrates one implementation of a communication system 400. The communication system 400 includes a hand-held, wireless mobile communication device 402, a management server 404, a user portal 406, and a special interest group (SIG) portal 408. In one implementation, the management server 404 is coupled to a user and profile database 410, an affiliate content database 412, and an integrated marketing database 414. In one implementation, the user and profile database 410 stores user profile information associated with each user—e.g., passwords, personal identification numbers (PINs), contact information, e-mail addresses, and the like; the affiliate content database 412 stores associations between special interest groups (SIGs) and users; and the integrated marketing database 414 stores artifacts (e.g., coupons, advertising, tickets, etc.) that can be sent to a user.

To enable the branding and customization of the mobile application (e.g., the mobile wallet application) running on the mobile communication device 402, in one implementation, various screens are designed based on meta-data (i.e., meta-data delivered (pulled or pushed) to the mobile communication device 402 based on the SIG). The core wallet screen can be the same for all subscribers—e.g., a login screen for all subscribers can have the same pre-defined format (controlling how content is displayed and permitted actions), and only the content is dynamically generated. The following screens, or category of screens, include (but are not limited to):

Logo—A community logo will display upon wallet launch. If a customer is not affiliated with a SIG, the default Blaze logo will be displayed.

Watermark—An almost transparent watermark image that does not to conflict with maps, wallpaper, etc.

Advertisements—Local advertisements from the community will be displayed instead of or in addition to general advertisements. If a customer is not affiliated with a SIG, general advertisements will be displayed.

Coupons—Coupons from the local community will be displayed instead of or in addition to general coupons. If a customer is not affiliated with a SIG, general coupons will be displayed.

Events—Community events will be displayed. If a customer is not affiliated with a SIG, general events will be displayed such as information about MCD (Mobile Candy Dish), new wallet features, etc.

Alerts—Community alerts will be displayed. If a customer is not affiliated with a SIG, general alerts will be displayed.

Maps—A community map will be displayed. Some examples of a community map include a campus map for a university, seating chart for a sports team, corporate campus map (particularly for large campuses like Google, Microsoft, etc.), and so forth.

In some cases, a special interest group (SIG) may be involved in the content approval process. In such an implementation, in order to deliver meta-data to the mobile communication device based on input from the SIG, the end-user's account (e.g., walletID, etc.) is associated with a SIG. The SIG will access a portal (web-based or otherwise) (e.g., SIG portal 408) that enables the SIG to control, publish, etc., content associated to the SIG on the management server 404. In one implementation, one or more screens queries the management server 404 for dynamic content (media, text, logo, sort order, etc.). The query can include (but is not limited to) the end-users walletID. Using a look-up table in the management server 404 or the affiliate content database 412, it is possible to determine the associated SIG. The management server 404 can then internally determine the appropriate content (including media, etc.) to respond to the mobile application running on the mobile communication device 402. These result sets can be cached on the mobile communication device 402 for future use to improve performance (as needed).

Logos

Figure 5:
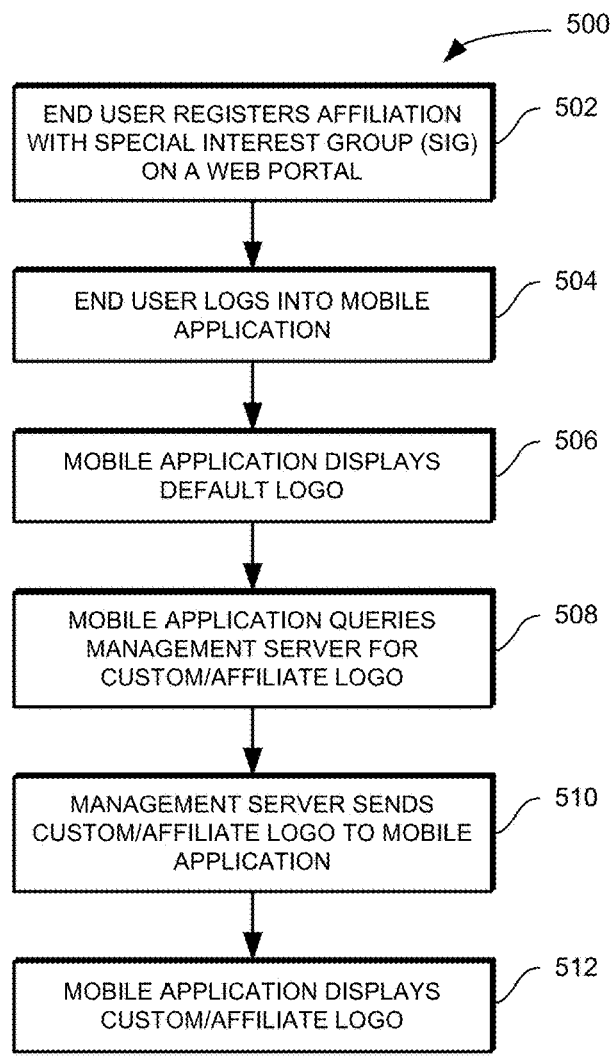
FIG. 5 illustrates one implementation of a method for customizing a mobile application with a custom/affiliate logo of a special interest group (SIG).
Figure 6:
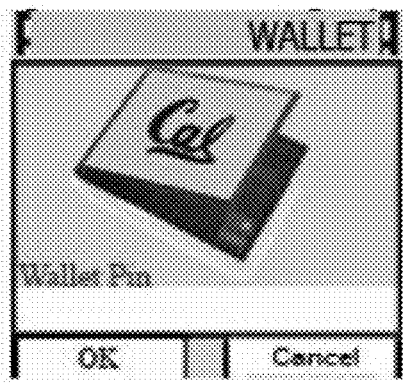
FIG. 6 illustrates an example custom/affiliate logo of a special interest group (SIG) that can be displayed on a mobile communication device.

FIG. 5 illustrates a method 500 for providing a logo to a mobile communication device (e.g., mobile communication device 402) for display through a mobile application running on the mobile communication device. An end user registers an affiliation with a special interest group (SIG) on a web portal (e.g., user portal 406) (step 502). Thereafter, the end user logs into the mobile application running on the mobile communication device (step 504). Upon initial login, the mobile application displays a default logo (step 506). The mobile application queries a management server (e.g., management server 404) for any custom/affiliate logos that is associated with the user (step 508). The management server determines which special interest groups (SIGs) that the user is affiliated with, and sends a custom/affiliate logo to the mobile application running on the mobile communication device (step 510). FIG. 6 illustrates an example logo of a University that can be sent to a mobile application. In response to receiving the custom/affiliate logo, the mobile application displays the custom/affiliate logo (step 512). In one implementation, the default logo is replaced with the custom/affiliate logo in response to the user logging off, and re-logging into the mobile application.

Integrated Mobile Marketing Insertion

In one implementation, an advertising manager application running on the management server 404 inserts advertisements (based on advertisement insertion order) into Ad Engine (or 3rdParty Ad Delivery platform). The advertising manager application specifies specific advertisements with targeting parameters of special interest groups (SIGs) (among other targeting parameters as specified by, e.g., an advertising agency) and displays these advertisements in the mobile application.

Integrated Mobile Marketing (Advertising and Coupons) Delivery

Figure 7:
FIG. 7 illustrates example advertisements/coupons of a special interest group (SIG) that can be displayed on a mobile communication device.

In one implementation, advertising and/or coupons can be sent to a mobile application based on one or more special interest groups (SIGs) that a user is affiliated with. In one implementation, an end user registers affiliation with a special interest group (SIG) through a web portal (e.g., user portal 406). The management system 406 can validate the affiliation out-of-band. The end user logs into mobile application, and the mobile application queries the management server 404 for any advertisements or coupons by providing a screenID (a unique screen identifier). The management server 404 determines that the user has an affiliation to a special interest group (SIG) and appends the SIGID (a unique SIG identifier) to the target parameters. A query including the targeting parameters is forwarded to an advertising engine (or 3rdParty). The advertising engine responds with the appropriate URL to the advertising object that best meets the advertising criteria (e.g., age, gender, geographic location, proximity to retail store, shopping list, transaction history, etc). In one implementation, the mobile application queries advertisements based on the URL returned. FIG. 7 illustrates example advertisements/coupons that can be displayed through a mobile application running on a mobile communication device.

Alerts and Notification

Figure 8:
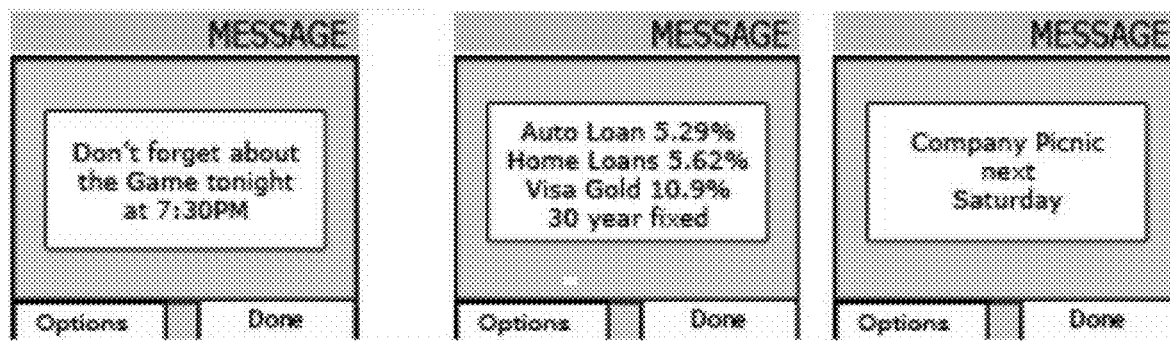
FIG. 8 illustrates example messages of a special interest group (SIG) that can be displayed on a mobile communication device.

In one implementation, alerts and notifications can be sent to a mobile application based on one or more special interest groups (SIGs) that a user is affiliated with. In one implementation, a notification manager application running on the management server 404 inserts alerts (based on an insertion order) into a notification engine associated with the management server 404 (or a third party notification delivery platform). The notification manager application associates the notifications (text, etc.) with one or more SIGIDs (among other targeting parameters as specified by, e.g., an advertising agency). In one implementation, the notification engine queries the user and profile database 410, and determines a list of walletIDs (of end users) that match the target delivery criteria. For each end-user identified, the management server 404 determines a notification mode (e.g., SMS/text messaging, e-mail, or both) and a delivery window (time of day, etc.). These criteria are used to send the notification (or alerts) to the end-user. FIG. 8 illustrates example alerts and notifications that can be displayed through a mobile application running on a mobile communication device.

Campus Maps

Figure 9:
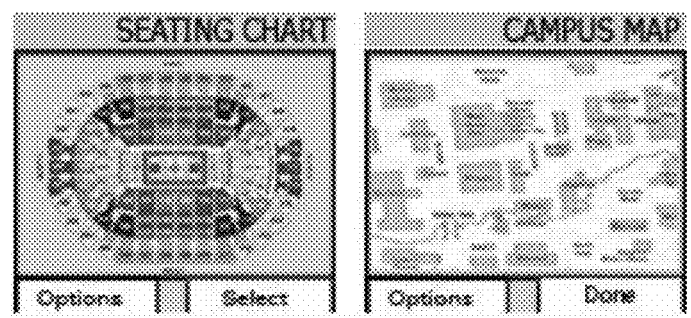
FIG. 9 illustrates example maps of a special interest group (SIG) that can be displayed on a mobile communication device.

In one implementation, maps can be sent to a mobile application based on one or more special interest groups (SIGs) that a user is affiliated with. In one implementation, and end user registers affiliation with a special interest group (SIG) through a web portal (e.g., user portal 406). The management system 404 can validate the affiliation of the user to the special interest group (SIG) out-of-band. The end user logs into the mobile application, and the mobile application queries the management server 404 for an affiliate campus map. The management server 404 determines that the end user has an affiliation with a special interest group (SIG), and responds to the query with a campus map associated with the special interest group (SIG). The campus map is cached in a memory of the mobile communication device 402, and the mobile application running on the mobile communication device 402 displays the campus map. FIG. 9 illustrates example maps/seating charts that can be displayed through a mobile application running on a mobile communication device.

Figure 10A:
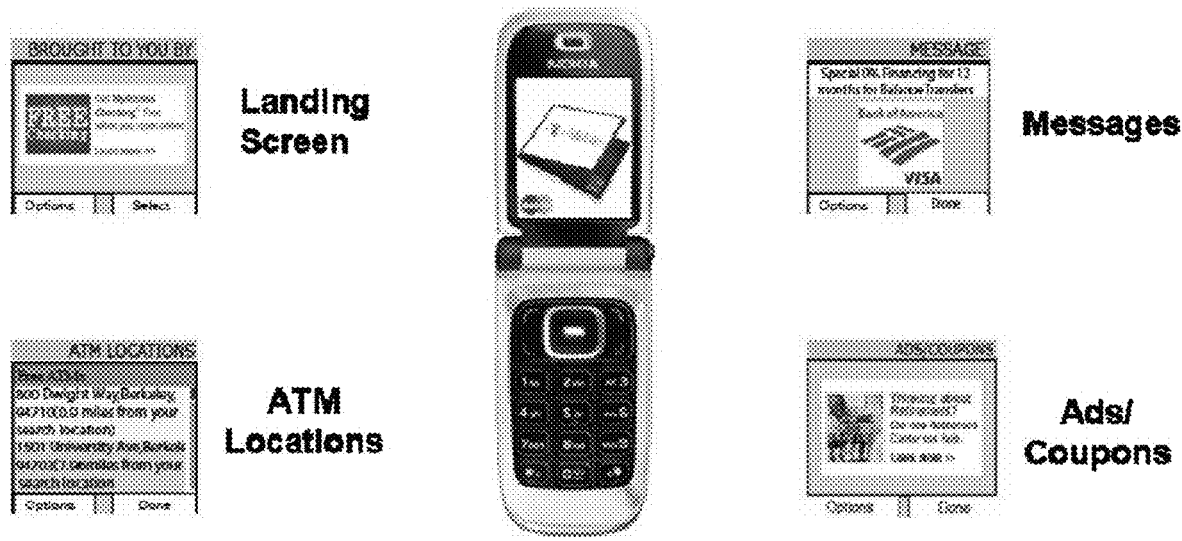
FIGS. 10A-10F illustrate example customization of a mobile application running on a mobile communication device.
Figure 10B:
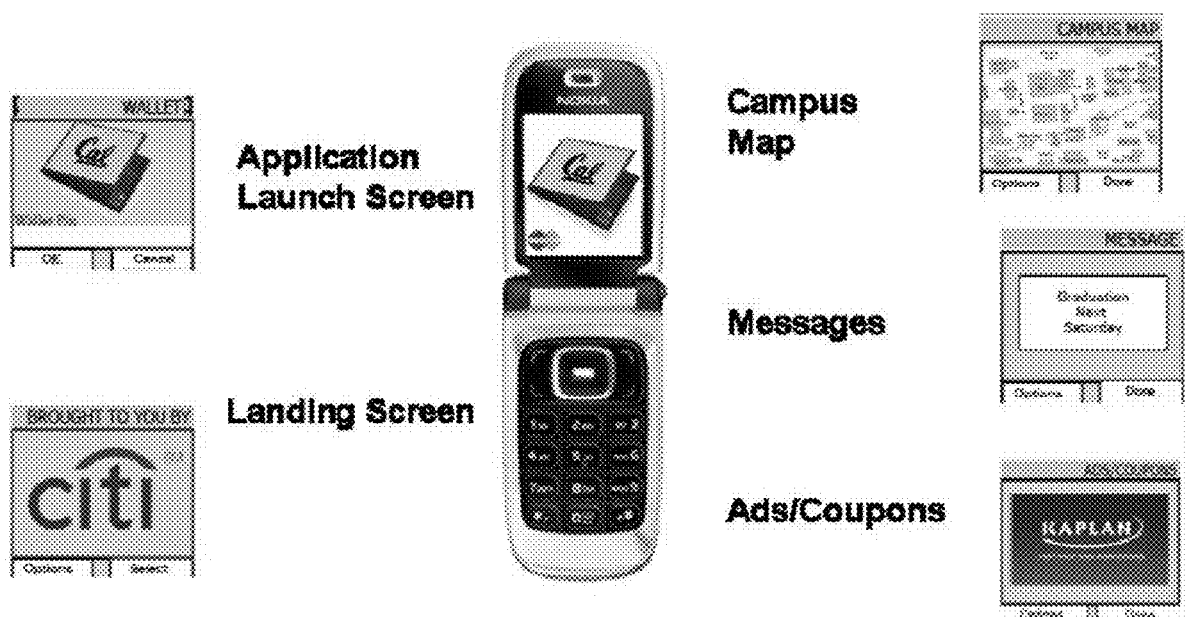
Figure 10C:
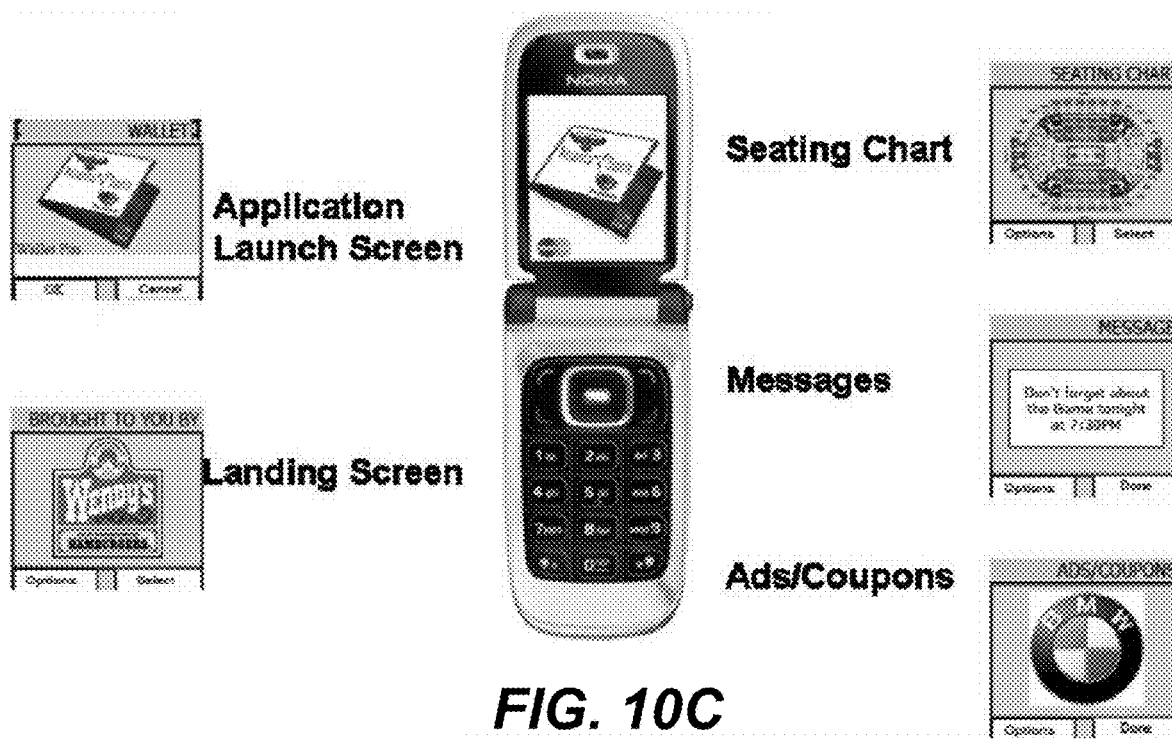
Figure 10D:
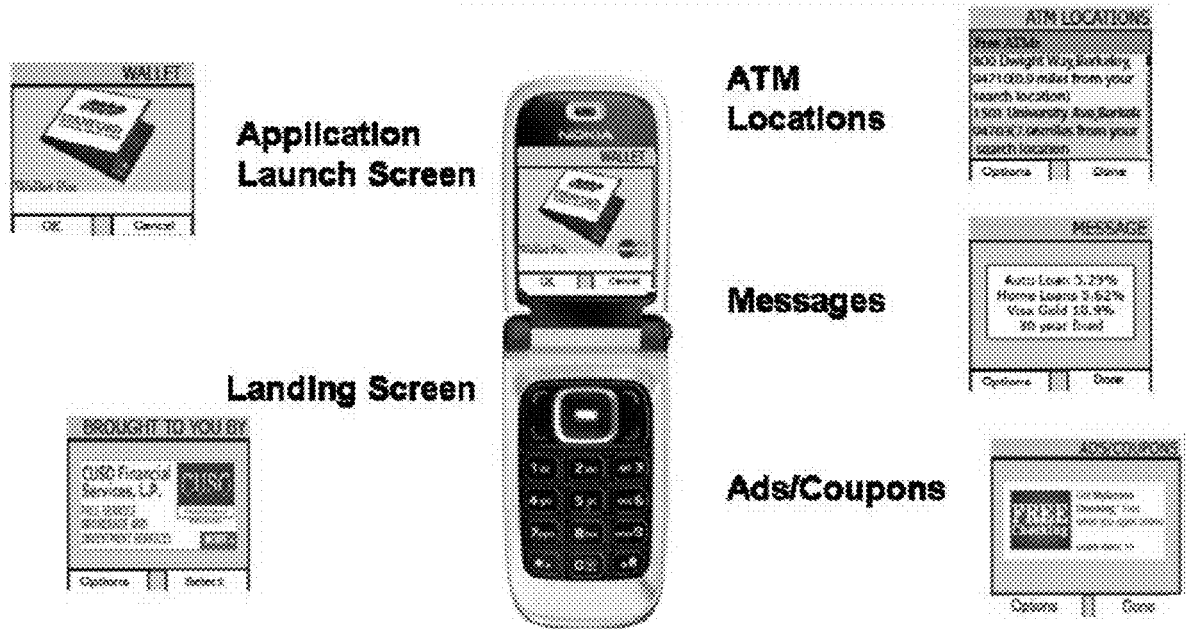
Figure 10E:
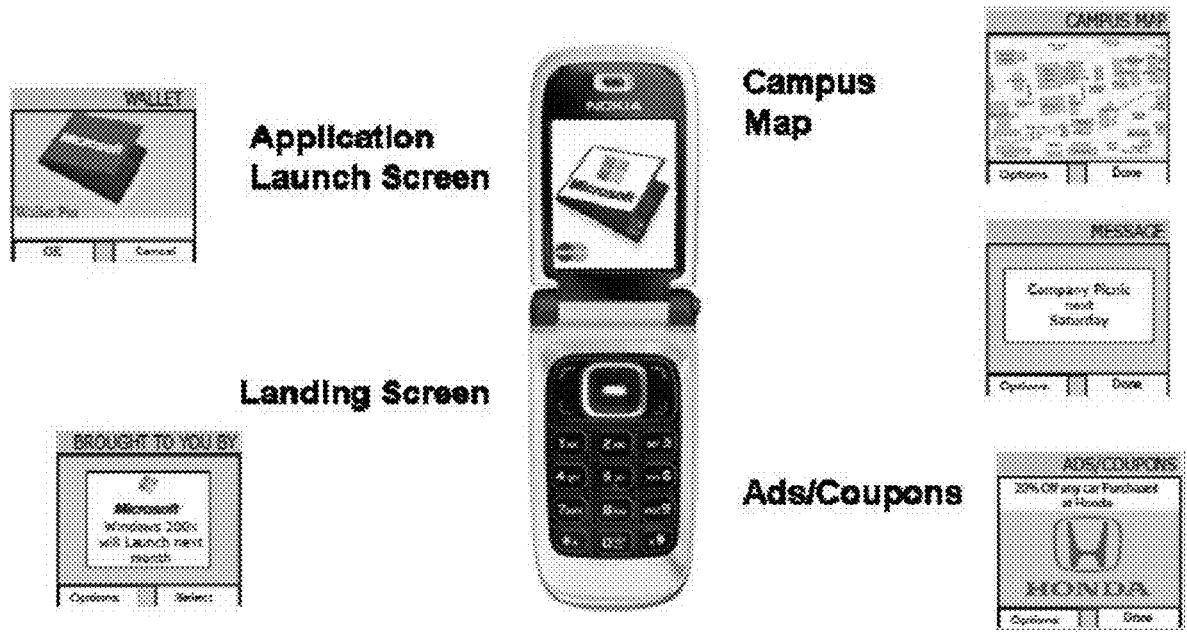
Figure 10F:
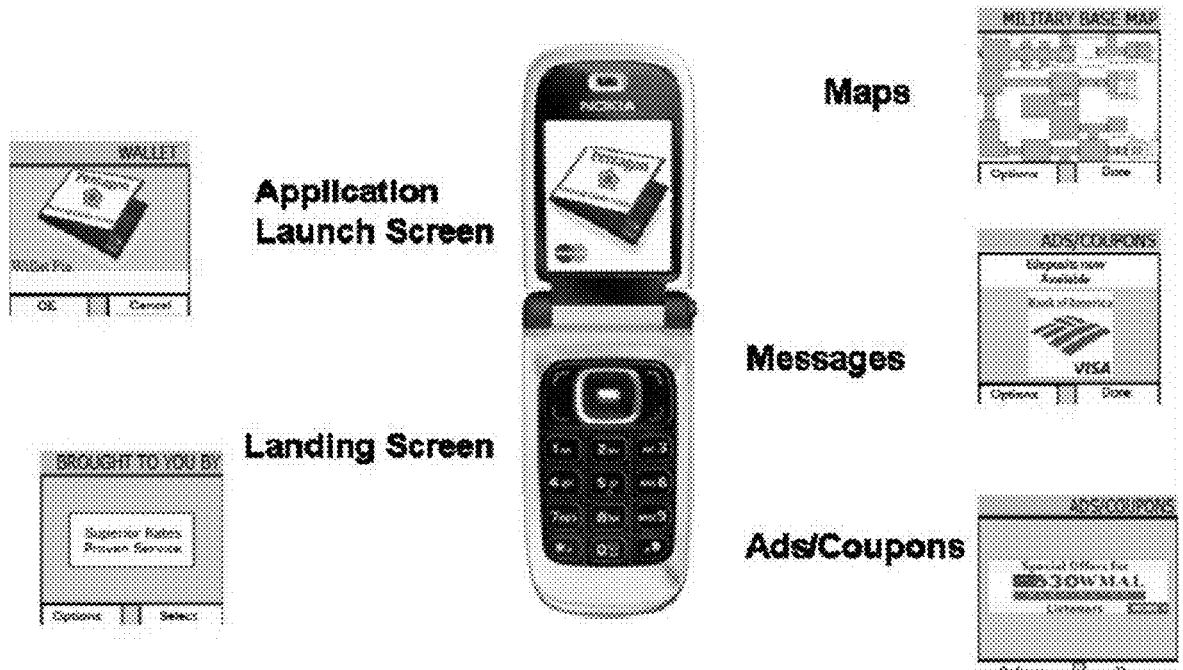
Figure 11:
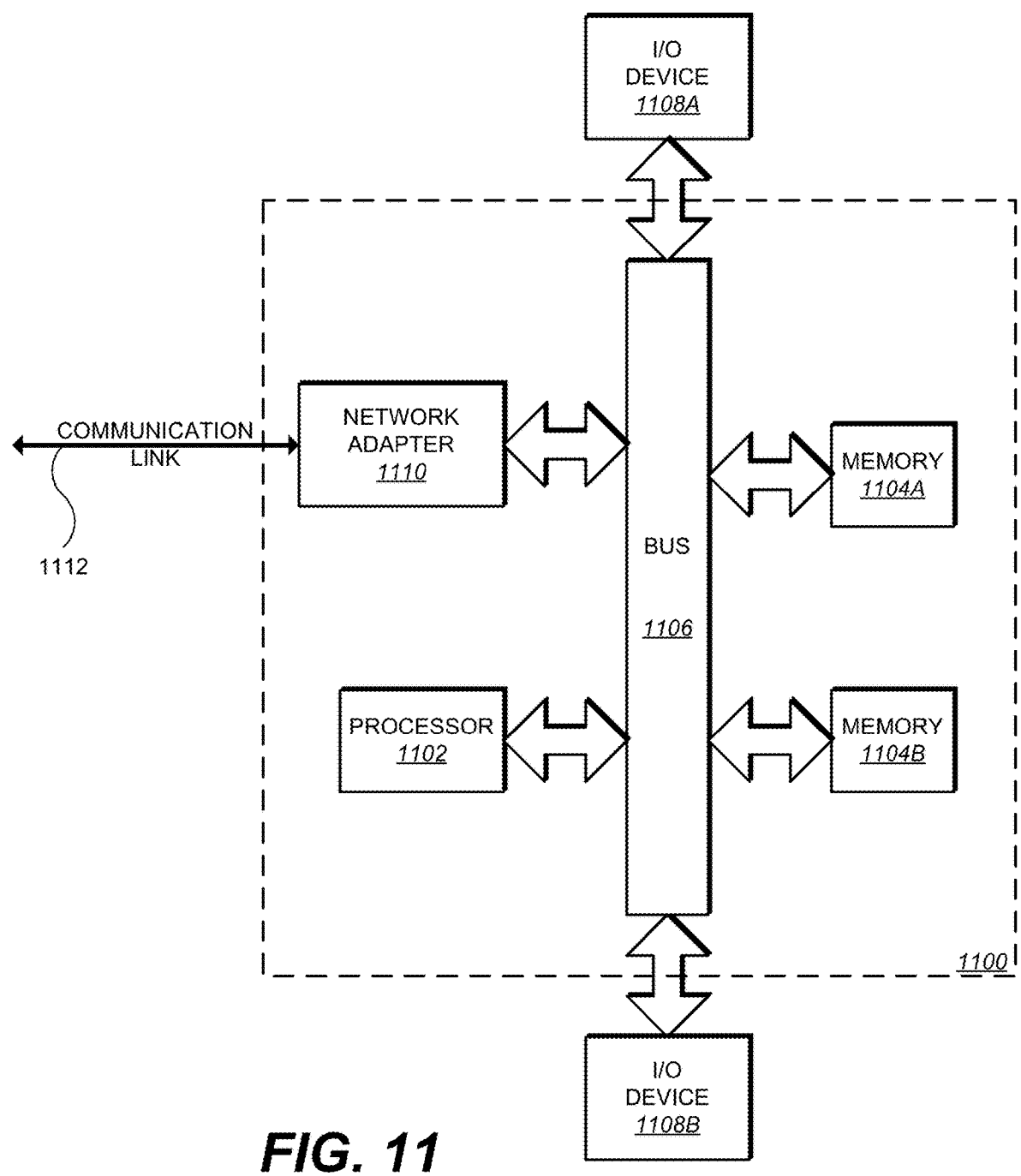
FIG. 11 illustrates a block diagram of a communication system including a wireless mobile communication device and a management server in accordance with one implementation.

FIGS. 10A-10F illustrate example screens, messages, advertisements, and/or coupons that can be displayed through a mobile application running on a mobile communication device. In particular, FIG. 10A illustrates example customization of a mobile application for a bank; FIG. 10B illustrates example customization of a mobile application for a university; FIG. 10C illustrates example customization of a mobile application for a sports team; FIG. 10D illustrates example customization of a mobile application for a credit union; FIG. 10E illustrates example customization of a mobile application for a corporation; and FIG. 10F illustrates example customization of a mobile application for a military campus. In general, the same generic platform of a mobile application can be used to deliver the different screens, messages, advertisements, and/or coupons shown in FIGS. 10A-10F.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

FIG. 5 illustrates a data processing system 1100 (e.g., a mobile communication device) suitable for storing and/or executing program code. Data processing system 1100 includes a processor 1102 coupled to memory elements 1104A-B through a system bus 1106. In other implementations, data processing system 1100 may include more than one processor and each processor may be coupled directly or indirectly to one or more memory elements through a system bus. Memory elements 1104A-B can include local memory employed during actual execution of the program code, bulk storage, and cache memories that provide temporary storage of at least some program code in order to reduce the number of times the code must be retrieved from bulk storage during execution. As shown, input/output or I/O devices 1108A-B (including, but not limited to, keyboards, displays, pointing devices, etc.) are coupled to data processing system 1100. I/O devices 1108A-B may be coupled to data processing system 1100 directly or indirectly through intervening I/O controllers (not shown).

In one implementation, a network adapter 1110 is coupled to data processing system 1100 to enable data processing system 1100 to become coupled to other data processing systems or remote printers or storage devices through communication link 1112. Communication link 1112 can be a private or public network. Modems, cable modems, and Ethernet cards are just a few of the currently available types of network adapters.

Although the present invention has been particularly described with reference to implementations discussed above, various changes, modifications and substitutes are can be made. Accordingly, it will be appreciated that in numerous instances some features of the invention can be employed without a corresponding use of other features. Further, variations can be made in the number and arrangement of components illustrated in the figures discussed above.

What is claimed is:

1. A method for displaying an advertisement using a non-browser based application stored on a mobile device, comprising:
    receiving user input from the non-browser based application, wherein the non-browser based application receives the user input via a mobile device display, wherein the non-browser based application is a non-browser based mobile application with a graphical user interface including a graphical icon that is preinstalled or downloaded and installed on the mobile device, the mobile device comprising the mobile device display, a mobile device processor, and a mobile device wireless radio interface;
    receiving, at the non-browser based application, the advertisement from a remote management server which selects the advertisement in response to the user input from the non-browser based application, wherein the advertisement is maintained at the remote management server; and
    displaying the advertisement within a specific non-browser based application generated screen, the specific non-browser based application generated screen corresponding to a specific screen or area of the non-browser based application.

2. The method of claim 1, wherein the advertisement is automatically selected in response to the user browsing a specific screen or area of the non-browser based application.

3. The method of claim 1, further wherein the advertisement is not based on a purchase transaction.

4. The method of claim 1, wherein the advertisement includes metadata operable to trigger a call to action.

5. The method of claim 4, wherein the call-to-action comprises entering an email address, accepting a coupon, accepting a reward, opt-in for alerts, and opt-in for notifications.

6. The method of claim 1, further wherein the advertisement is based on one or more targeting parameters.

7. The method of claim 6, wherein the one or more targeting parameters comprise personal information and purchase transaction related information.

8. The method of claim 7, wherein personal information comprises location, gender, age, interest, affiliation, userid, pageid, zip code, area code, and occupation.

9. The method of claim 7, wherein purchase transaction related information comprises one or more of information related to historical payment transaction, information related to real-time payment transaction, information related to contactless transactions made using the mobile device, information related to internet commerce, information related to bill pay, information related to top spend categories, information related to merchants, information related to storage of banking information, information related to accessing account balance, information related to accessing payment history, information related to accessing funds transfer, information related to storing tickets, information related to storing receipts, information related to coupons, information related to transactions made by the user but not through the mobile device, and information related to raw data downloaded from banks.

10. The method of claim 1, wherein the user is affiliated with a special interest group.

11. The method of claim 1, further wherein the advertisement is cached on the mobile device and is accessible by the non-browser based application when there is not a wireless network connection.

12. The method of claim 1, wherein the non-browser based application is operable when it is not connected to a wireless network.

13. The method of claim 1, wherein upon the condition that the mobile device loses connection with a wireless network, the non-browser based application monitors for access to the wireless network and automatically reconnects to the wireless network when the wireless network is available.

14. The method of claim 1, further wherein the, non-browser based application sends a request to the remote management server to retransmit the advertisement if it has not received the advertisement from the remote management server within a certain period of time.

15. The method of claim 1, further wherein the non-browser based application is configured to use a structured format and further wherein the structured format means the non-browser based application can store and display the advertisement in an organized and easily retrievable fashion.

16. The method of claim 1, wherein the remote management server sends the advertisement to the specific non-browser based application generated screen based on the geographical location of the mobile device.

17. The method of claim 1, further wherein prior to receiving the user input, the non-browser based application receives, information related to an identification code associated with a user and information related to a user authentication, wherein the non-browser based application receives the information related to the identification code associated with the user and the information related to the user authentication via the mobile device display of the mobile device.

18. The method of claim 17, wherein the user authentication includes information related to a PIN.

19. The method of claim 17, wherein the user authentication includes information related to biometric data.

20. A non-browser based non-transitory computer-readable medium product for displaying an advertisement, comprising a non-browser based application stored on a mobile device that causes the mobile device to: receive user input from the non-browser based application, wherein the non-browser based application receives the user input via a mobile device display, wherein the non-browser based application is a non-browser based mobile application including a graphical user interface with a graphical icon that is preinstalled or downloaded and installed on the mobile device, the mobile device comprising the mobile device display, a mobile device processor, and a mobile device wireless radio interface; receive, at the non-browser based application, the advertisement from a remote management server which selects the advertisement in response to the user input from the non-browser based application, wherein the advertisement is maintained at the remote management server; and display the advertisement within a specific non-browser based application generated screen, the specific non-browser based application generated screen corresponding to a specific screen or area of the non-browser based application.

21. The non-browser based non-transitory computer-readable medium product of claim 20, wherein the advertisement is automatically selected in response to the user browsing a specific screen or area of the non-browser based application.

22. The non-browser based non-transitory computer-readable medium product of claim 20, further wherein the advertisement is not based on a purchase transaction.

23. The non-browser based non-transitory computer-readable medium product of claim 20, wherein the advertisement includes metadata operable to trigger a call to action.

24. The non-browser based non-transitory computer-readable medium product of claim 23, wherein the call-to-action comprises entering an email address, accepting a coupon, accepting a reward, opt-in for alerts, and opt-in for notifications.

25. The non-browser based non-transitory computer-readable medium product of claim 20, further wherein the advertisement is based on one or more targeting parameters.

26. The non-browser based non-transitory computer-readable medium product of claim 25, wherein the one or more targeting parameters comprise personal information and purchase transaction related information.

27. The non-browser based non-transitory computer-readable medium product of claim 26, wherein personal information comprises location, gender, age, interest, affiliation, userid, pageid, zip code, area code, and occupation.

28. The non-browser based non-transitory computer-readable medium product of claim 26, wherein purchase transaction related information comprises one or more of information related to historical payment transaction, information related to real-time payment transaction, information related to contactless transactions made using the mobile device, information related to internet commerce, information related to bill pay, information related to top spend categories, information related to merchants, information related to storage of banking information, information related to accessing account balance, information related to accessing payment history, information related to accessing funds transfer, information related to storing tickets, information related to storing receipts, information related to coupons, information related to transactions made by the user but not through the mobile device, and information related to raw data downloaded from banks.

29. The non-browser based non-transitory computer-readable medium product of claim 20, wherein the user is affiliated with a special interest group.

30. The non-browser based non-transitory computer-readable medium product of claim 20, further wherein the advertisement is cached on the mobile device and is accessible by the non-browser based application when there is not a wireless network connection.

31. The non-browser based non-transitory computer-readable medium product of claim 20, further wherein the non-browser based application is operable when it is not connected to a wireless network.

32. The non-browser based non-transitory computer-readable medium product of claim 20, wherein upon the condition that the mobile device loses connection with a wireless network, the non-browser based application monitors for access to the wireless network and automatically reconnects to the wireless network when the wireless network is available.

33. The non-browser based non-transitory computer-readable medium product of claim 20, further wherein the, non-browser based application sends a request to the remote management server to retransmit the advertisement if it has not received the advertisement from the remote management server within a certain period of time.

34. The non-browser based non-transitory computer-readable medium product of claim 20, further wherein the non-browser based application is configured to use a structured format and further wherein the structured format means the non-browser based application can store and display the advertisement in an organized and easily retrievable fashion.

35. The non-browser based non-transitory computer-readable medium product of claim 20, wherein the remote management server sends the advertisement to the specific non-browser based application generated screen based on the geographical location of the mobile device.

36. The non-browser based non-transitory computer-readable medium product of claim 20, further wherein prior to the user input, the non-browser based application receives, information related to an identification code associated with a user and information related to a user authentication, wherein the non-browser based application receives the information related to the identification code associated with the user and the information related to the user authentication via the mobile device display of the mobile device.

37. The non-browser based non-transitory computer-readable medium product of claim 36, wherein the user authentication includes information related to a PIN.

38. The non-browser based non-transitory computer-readable medium product of claim 36, wherein the user authentication includes information related to biometric data.

* * * * *

(12) EX PARTE REEXAMINATION CERTIFICATE (13058th)
United States Patent
Fisher

(10) Number: US 10,621,612 C1
(45) Certificate Issued: Oct. 16, 2025

(54) DISPLAYING AN ADVERTISEMENT IN RESPONSE TO USER INPUT USING A NON-BROWSER BASED APPLICATION

(71) Applicant: Michelle Fisher, Berkeley, CA (US)

(72) Inventor: Michelle Fisher, Berkeley, CA (US)

(73) Assignee: Blaze Mobile, Inc.

Reexamination Request:
No. 90/019,116, Sep. 30, 2022

Reexamination Certificate for:
Patent No.: 10,621,612
Issued: Apr. 14, 2020
Appl. No.: 16/457,874
Filed: Jun. 28, 2019

Related U.S. Application Data

(63) Continuation of application No. 15/980,735, filed on May 15, 2018, now Pat. No. 10,339,556, which is a continuation of application No. 15/134,101, filed on Apr. 20, 2016, now Pat. No. 9,996,849, which is a continuation of application No. 14/180,562, filed on Feb. 14, 2014, now abandoned, which is a continuation of application No. 11/956,261, filed on Dec. 13, 2007, now Pat. No. 8,693,995.

(51) Int. Cl.

| | |
|---|---|
| *G06Q 30/0207* | (2023.01) |
| *G06F 3/0484* | (2022.01) |
| *G06Q 20/32* | (2012.01) |
| *G06Q 30/0241* | (2023.01) |
| *G06Q 30/0251* | (2023.01) |
| *G06Q 40/02* | (2023.01) |
| *H04L 9/40* | (2022.01) |
| *H04L 67/00* | (2022.01) |
| *H04L 67/306* | (2022.01) |
| *H04M 1/72406* | (2021.01) |
| *H04M 1/72427* | (2021.01) |
| *H04W 4/02* | (2018.01) |
| *H04W 4/024* | (2018.01) |
| *H04W 4/60* | (2018.01) |
| *H04W 4/80* | (2018.01) |
| *H04W 8/18* | (2009.01) |

(52) U.S. Cl.
CPC ....... *G06Q 30/0239* (2013.01); *G06F 3/0484* (2013.01); *G06Q 20/322* (2013.01); *G06Q 30/0267* (2013.01); *G06Q 30/0277* (2013.01); *G06Q 40/02* (2013.01); *H04L 63/0428* (2013.01); *H04L 67/34* (2013.01); *H04W 4/02* (2013.01); *H04W 4/024* (2018.02); *H04W 4/60* (2018.02); *H04W 4/80* (2018.02); *H04L 67/306* (2013.01); *H04M 1/72406* (2021.01); *H04M 1/72427* (2021.01); *H04W 8/18* (2013.01)

(58) Field of Classification Search
None
See application file for complete search history.

(56) References Cited

To view the complete listing of prior art documents cited during the proceeding for Reexamination Control Number 90/019,116, please refer to the USPTO's Patent Electronic System.

*Primary Examiner* — Eric B. Kiss

(57) ABSTRACT

A method and system for customizing a mobile application running on a mobile communication device of a user. In one implementation, the method includes providing the mobile application to the mobile communication device of the user, the mobile application having a generic platform; determining a special interest group (SIG) that is affiliated with the user; and customizing the generic platform of the mobile application based on information specific to the special interest group (SIG) that is affiliated with the user.

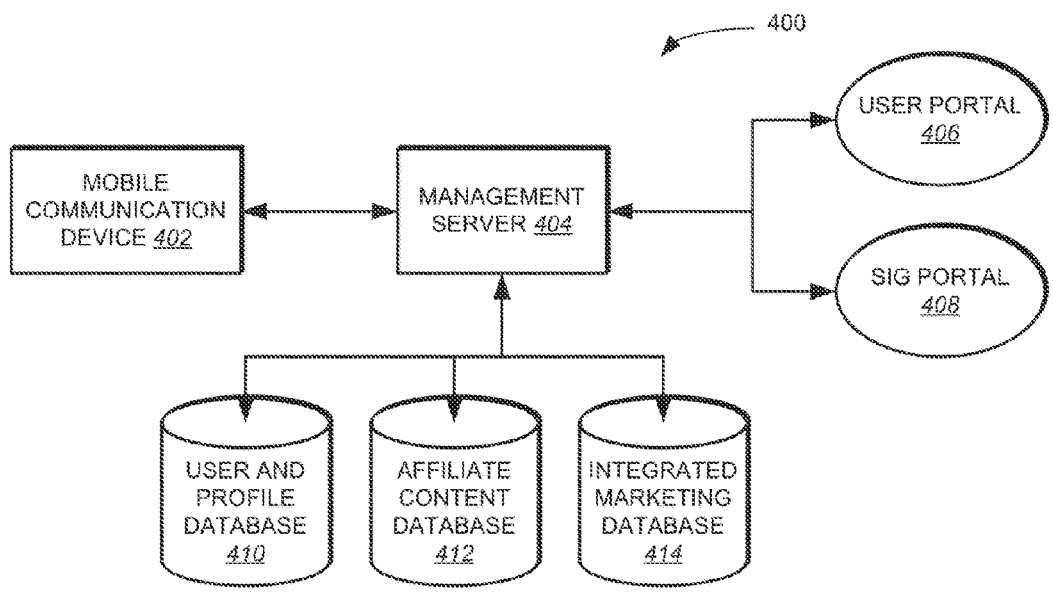

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

The patentability of claims 1-4, 6-10, 12, 15-18, 20-23, 25-29, 31 and 34-37 is confirmed.

Claims 11, 13, 19, 30, 32 and 38 are cancelled.

Claims 5, 14, 24 and 33 were not reexamined.

\* \* \* \* \*